United States Patent [19]

Leese et al.

[11] Patent Number: 5,143,871
[45] Date of Patent: Sep. 1, 1992

[54] CLAY BODIES OF CHINA AND BALL CLAYS CONTAINING HEAT TREATED CLAY COMBINED WITH RAW CLAY COMPONENTS

[75] Inventors: Samuel M. Leese, Ipplepen; Dennis Mitchell, Ashburton, both of United Kingdom

[73] Assignee: Watts Blake Bearne & Co. PLC, Devon, United Kingdom

[21] Appl. No.: 474,077

[22] PCT Filed: Sep. 19, 1989

[86] PCT No.: PCT/GB89/01094

§ 371 Date: May 22, 1990

§ 102(e) Date: May 22, 1990

[87] PCT Pub. No.: WO90/03347

PCT Pub. Date: Apr. 5, 1990

[30] Foreign Application Priority Data

Sep. 20, 1988 [GB] United Kingdom ............ 8822127
Apr. 20, 1989 [GB] United Kingdom ............ 8908933

[51] Int. Cl.$^5$ ................. C04B 33/04; C04B 33/24
[52] U.S. Cl. ....................... 501/150; 106/416; 106/486; 501/144
[58] Field of Search .......... 501/150, 144; 106/468, 106/416, 38.27, 38.9

[56] References Cited

U.S. PATENT DOCUMENTS

| | | | |
|---|---|---|---|
| Re. 20,555 | 11/1937 | Sproal | 501/144 |
| 1,830,934 | 11/1931 | Curtis | 501/150 |
| 3,309,214 | 3/1967 | Podschus et al. | 501/150 |
| 3,941,872 | 3/1976 | Pusrar | 106/486 X |
| 4,017,324 | 4/1977 | Eggers | 106/468 X |
| 5,011,534 | 4/1991 | Berube et al. | 106/416 |

FOREIGN PATENT DOCUMENTS

| | | |
|---|---|---|
| 2140982 | 2/1973 | Fed. Rep. of Germany . |
| WO90/03347 | 4/1990 | PCT Int'l Appl. . |
| 869966 | 6/1961 | United Kingdom . |
| 1113538 | 5/1968 | United Kingdom . |
| 1181491 | 2/1970 | United Kingdom . |
| 1317735 | 5/1973 | United Kingdom . |
| 1478851 | 7/1977 | United Kingdom . |
| 1480420 | 7/1977 | United Kingdom . |
| 1571264 | 7/1980 | United Kingdom . |
| 2067535 | 5/1983 | United Kingdom . |
| 8822127-0 | 11/1988 | United Kingdom . |

OTHER PUBLICATIONS

"Introduction to the Principles of Ceramic Processing" James S. Reed, 1988 pp. 463, 464 and 380–386.

Primary Examiner—William R. Dixon, Jr.
Assistant Examiner—Lisa M. Schull
Attorney, Agent, or Firm—Merchant, Gould, Smith, Edell, Welter & Schmidt

[57] ABSTRACT

In a method of preparing a treated clay product, clay is heated such that kalinite in the clay is converted to metakaolin, substantially no mullite being formed. The treated product may be combined with raw ball clay and/or china clay to provide compositions suitable for use in manufacturing china articles. The casting compositions enable the casting step to be accelerated and are particularly suitable for use in pressurized casting methods.

11 Claims, No Drawings

CLAY BODIES OF CHINA AND BALL CLAYS CONTAINING HEAT TREATED CLAY COMBINED WITH RAW CLAY COMPONENTS

The present invention relates to materials for use in the manufacture of ceramic articles. In particular, the invention provides a composition that is suitable for use in the manufacture of china articles, for example vitreous china ware such as sanitary ware, and a method of making a china article in which the said composition is used.

In one known method of making china articles (the slip-casting method) an aqueous slip is introduced into a plaster mould. De-watering of the slip occurs through the plaster mould. After de-watering sufficient to form a cast article of the desired thickness has occurred, excess slip is drained from the mould, the article is allowed to harden and, after removal from the mould, is trimmed, dried, glazed and fired. In this method the de-watering step may take from 1 to 1½ hours and, typically, a further period of 1½ hours is required for hardening before the cast article can be removed from the mould.

In another known method (the pressurised casting method) an aqueous slip is placed in a mould and the mould is pressurised to accelerate de-watering of the slip. The mould may be of, for example, porous plastics material, mineral fibres, or sand/resin blocks. In one version of the pressurised casting method the mould is of porous plastics material and, at a pressure of 300 $in^{-2}$ ($2.1 \times 10^6 Nm^{-2}$), adequate de-watering may be accomplished within a period of from 8 to 10 minutes. In this version of the pressurised casting method, the following steps are generally carried out: the mould is filled with the slip, the mould is pressurised for a period of from 8 to 10 minutes, excess slip is drained from the mould, the article is consolidated by applying air pressure such that further de-watering of the material occurs through the mould, and the resulting cast article is then released and removed from the opened mould. The total time required for completion of these steps will normally be of the order of 12 to 15 minutes.

In the known methods discussed above an aqueous slip comprising china clay, ball clay, a flux and a filler is generally used. A typical aqueous slip might consist, for example, of 25% by weight china clay, 25% by weight ball clay, 20% by weight flux, 30% by weight filler and water in an amount which is sufficient to give a liquid slip of relatively low viscosity. Other ingredients, for example, a deflocculating agent, may be included. The flux may be, for example, a feldspar-containing flux, for example nepheline syenite, or any other suitable material which melts at the temperature to be used for the firing step to fuse the other ingredients together. The filler is normally a silica filler and may be for example sand, quartz or flint. Flint which has been fired at a temperature of the order of 1000° C. and crushed may be used as the filler. The slip may comprise, in replacement of a part of the china clay and/or a part of the ball clay, from 5 to 15% grog (that is, ground faulty china ware). The grog is thus material which has already been subjected to conditions suitable for firing china, for example firing at a temperature of 1200° C. The thickness of the cast articles is normally in the region of from 8 to 10 mm.

The present invention provides a composition comprising a treated clay product which has been prepared by heating clay, the heating conditions being such that kaolinite in the clay is converted to metakaolin, while substantially avoiding the formation of mullite; and raw ball clay and/or raw china clay.

The term "raw" is used herein in relation to clay to mean a clay which has not been subjected, subsequent to its extraction from the ground, to conditions which would be likely to effect a crystalline transformation of any of the ingredients of the clay.

Preferably, the treated clay product has been prepared by heating ball clay. Advantageously, the composition comprises the treated ball clay and raw ball clay in a ratio of from 1:2 to 4:1 by weight. Instead of, or in addition to, the raw ball clay, the composition may comprise raw china clay, the treated ball clay product and the china clay being present in a ratio of from 1:1 to 7:4 by weight.

The treated ball clay product may be obtained for example, by heating ball clay to a temperature of from 560° C. to 1130° C. for a time of from 10 minutes to 2.5 hours. The temperatures in the upper part of the specified temperature range correspond to the shorter heating times and the temperatures in the lower part of the specified temperature range correspond to the longer heating times.

Preferably, the treated ball clay product has been obtained by heating ball clay until the bulk density of the clay is reduced to within the range of from 1.75 to 2.0 $g/cm^3$. The bulk density of the ball clay may be monitored during heating, the clay being heated until the bulk density of the clay is reduced to within a desired range. By selecting an appropriate desired range it is possible to ensure that the treated product will have particularly good properties.

Preferably the heating conditions in preparation of the treated clay product are such that substantially all the kaolinite in the clay is converted to metakaolin.

The possible range of temperatures and the length of time, required at a chosen temperature within that range, to convert kaolinite, and advantageously substantially all the kaolinite, in ball clay to metakaolin with substantially no conversion of the metakaolin to mullite, may depend on the ball clay used. The term "ball clay" as used herein encompasses any plastic clay and, in particular, is not limited in terms of the geographical location of the source of the clay. Thus, one type of ball clay (having a chemical analysis of $SiO_2$ (56.2%), $TiO_2$ (1.2%), $Al_2O_3$ (28.6%), $Fe_2O_3$ (1.0%), CaO (0.2%), MgO (0.3%), $K_2O$ (1.8%) and $Na_2O$ (0.2%), loss on ignition of 10.6% and a calculated mineralogy (Mica Convention) of 55% kaolinite, 15% potash mica, 2% soda mica, 22% quartz and 2% carbonaceous matter) may be heated in accordance with the invention to a temperature within the range of from 570° C. to 1130° C. (The percentages given above and elsewhere herein are by weight.) At a temperature of 1130° C., a heating time in the region of 10 minutes is sufficient to convert kaolinite in the ball clay to metakaolin, substantially no mullite being formed; the bulk density of the product so obtained is in the order of 2 $g/cm^3$. If, however, a lower temperature is used a longer heating time will be required. For example, at a temperature of 570° C. a heating time of more than two hours may be required.

Another type of ball clay (having a chemical analysis of $SiO_2$ (53.4%), $TiO_2$ (1.2%), $Al_2O_3$ (29.8%), $Fe_2O_3$ (1.0%) CaO (0.2%), MgO (0.3%), $K_2O$ (2.1%), $Na_2O$ (0.3%), loss on ignition of 11.7% and a calculated mineralogy (Mica Convention) of 53% Kaolinite 17% potash Mica, 4% soda Mica, 20% quartz and 3% carbonaceous matter) may be heated in accordance with the invention to a temperature within the range of from 560° to 1080° C. At a temperature of 1080° C. a heating time of in the region of 10 minutes will be sufficient whereas at a temperature of 560° C. a heating time of more than two hours may be required. Determination of appropriate time/temperature regimes for other ball clays is a matter of routine experiment. The heating may be carried out in the presence of air.

While in the most preferred form of the invention the treated clay product is a product which has been prepared by heating ball clay, it can also be a treated product prepared by heating china clay, appropriate time/temperature regimes for effecting transformation of kaolinite to metakaolin while substantially avoiding the formation of mullite then being determinable by routine experiment. Mixtures of ball clay and china clay can also be used.

The composition of the invention is suitable for use in the manufacture of china articles, especially vitreous china articles, for example sanitary ware. The use of the composition of the invention as a component of a casting composition for the manufacture of china enables the casting step to be accomplished more quickly than in processes in which the previously known casting compositions are used.

When the composition is to be used in the manufacture of china, the treated clay product to be mixed with the raw ball clay and/or raw china clay is preferably ground. The treated clay product may be ground in a ball mill to the desired degree of fineness. Preferably, the treated clay product is ground such that at least 90% by weight of the ground product has a particle size of less than $20\mu$. Particles of size greater than $20\mu$ may be removed by screening and, if desired, recycled to the grinding step.

The composition may be prepared by mixing the treated clay product with raw ball clay and/or raw china clay, the mixture so obtained being shaped, dried and divided. For example, the composition including the treated clay product and the raw ball clay and/or the raw china clay may be extruded as elongate rods which may then be dried and divided into pellets. The composition is advantageously dried to a moisture content of not less than 7%, wet basis. The dried composition is in general brittle and may disintegrate into pellets without assistance. The composition may then be combined with a flux and a filler and, if desired, with further ball clay and/or china clay, for use in the manufacture of china articles, for example by the slip-casting or pressurised casting methods.

The present invention further provides a casting composition for use in the manufacture of china articles, the composition comprising:
 a treated clay product which has been prepared by heating clay, the heating conditions being such that kaolinite in the clay is converted to metakaolin, while substantially avoiding the formation of mullite;
 raw ball clay;
 raw china clay;
 a suitable flux: and,
 a suitable filler.

Preferably, the treated clay product has been prepared by heating ball clay. The casting composition preferably comprises from 10 to 20 parts by weight of the treated ball clay product, from 5 to 20 parts by weight of raw ball clay, and from 10 to 35 parts by weight china clay, the combined weight of the flux and filler being not less than the combined weight of the treated ball clay product, the raw ball clay and the china clay.

While the use of a treated clay product prepared by heating ball clay is especially preferred in the casting composition of the invention, the treated clay product can also be a product which has been prepared by heating china clay.

For use in the manufacture of china, the casting composition may further comprise water. The amount of water is preferably such that the composition is flowable. For example, the composition may further comprise from 10 to 30 parts by weight water in addition to the water present in the other constituents. The casting composition may advantageously comprise an effective amount of a deflocculant and may comprise other ingredients, for example dispersants and colouring agents. The flux may be, for example, a feldspar-containing flux. The filler may be, for example, a filler selected from quartz, sand and flint.

In addition, the present invention provides a method of manufacturing a china article, comprising placing in a mould an aqueous slurry comprising a treated clay product which has been prepared by heating clay, the heating conditions being such that kaolinite in the clay is converted to metakaolin, while substantially avoiding the formation of mullite, the slurry further comprising raw ball clay and/or raw china clay, removing at least some water from the slurry, draining from the mould any remaining slurry, removing the article from the mould, drying and firing the article. The aqueous slurry preferably further comprises raw ball clay, china clay, a flux and a filler. In a preferred method, the aqueous slurry comprises from 10 to 20 parts by weight of the treated ball clay product, from 5 to 20 parts by weight of raw ball clay, from 10 to 35 parts by weight china clay, the combined weight of the flux and filler being not less than the combined weight of the treated ball clay product, the raw ball clay and the china clay.

The treated product may be a treated product which has been prepared by heating china clay.

The method of the invention permits casting to be accomplished in a reduced time as compared with the previously known methods. Preferably, the mould is pressurised during the removal of water from the slurry. For example, a pressure of greater than 40 lb in$^{-2}$ ($2.7 \times 10^5 Nm^{-2}$), more especially a pressure of from 40 to 700 lb in $^{-2}$) ($2.7 \times 10^5$ to $4.8 \times 10^6 NM^{-2}$), may be maintained in the mould. Using the method of the invention it is possible to accomplish a de-water step in the pressurised casting method, using a pressure of 300 lb in$^{-2}$ ($2.1 \times 10^6 Nm^{-2}$), in a period of from 2 to 4 minutes. An article may thus be cast in the pressurised casting method in a total time of from 4 to 8 minutes, from filling the mould to removal of the cast article from the mould.

When a pressurised casting mould is used, the casting composition of the invention, including water, may be heated to 40° C. before introduction into the mould. Preferably, the casting composition is agitated continuously immediately prior to the transfer to the mould to maintain an even distribution of the components of the casting composition. On removal from the mould the cast article may be dried, finished (trimmed), and fired by any suitable method, for example by methods used in previously known casting processes. If desired, the cast article may be trimmed before drying. On removal from the mould the cast article may have a moisture content of, for example 20% wet basis. The article may be dried in open air at ambient temperature. Advantageously, however, the article is force-dried, for example microwave-dried, to reduce the moisture content by from 1 to 5%, especially from 1 to 2%, wet basis and is subsequently further dried in open air at ambient temperature.

The casting composition of the invention is particularly suitable for use in the manufacture of vitreous china. The article may be glazed by any suitable method.

A further advantage of the casting composition of the invention is that the cast article is suitable for quick firing. Firing may be carried out by subjecting the articles manufactured according to the invention to a temperature which increases continuously or stepwise to a maximum temperature of the order of 1200° C., which may be maintained for a period of up to 5 hours, the temperature then being reduced gradually in continuous or stepwise manner. When the article is quick-fired a total time of 10 hours is required for the firing step.

The casting composition of the invention may be used in the manufacture of sanitary ware, for example, soap dishes, wash basins and other vitreous china products, for example airline trays.

The following Examples illustrate the invention:

EXAMPLE 1(a)

A quantity of shredded ball clay having the following composition: $SiO_2$ (67.5%), $TiO_2$ (1.5%), $Al_2O_3$ (21.7%), $Fe_2O_3$ (0.8%), CaO (0.18%), MgO (0.28%), $K_2O$ (2.37%) $Na_2O$ (0.26%), loss on ignition of (5.8%) and having a calculated minerology (Mica Convention) of 32% Kaolinite, 20% Potash Mica, 3% Soda Mica, 42% Quartz and 0.25% carbonaceous matter is heated to 1000° C. for a period of ten minutes in a Brisesco belt kiln, giving a product bulk density of 1.80 g/cm³. The material is allowed to cool naturally to ambient temperature and is then ground in a hammer mill and classified in a British Rema Classifier, particles of greater than 40μ being removed. The ground product has a particle size distribution of:

| size: | 20μ | 10μ | 5μ | 2μ | 1μ |
|---|---|---|---|---|---|
| % less than | 92 | 77 | 59 | 40 | 25 |
| (as determined using a Micromeritics Sedigraph). | | | | | |

EXAMPLE 1(b)

The product from Example 1(a) is included as a component in a method for manufacturing a sanitary ware body, in which method
- 16% by weight ground treated ball clay product prepared as described in Example 1(a);
- 8% by weight raw ball clay;
- 26% by weight china clay;
- 30% by weight quartz; and
- 20% by weight nepheline syenite are mixed with water to a slip fluid density of 1.825 gcm$^{-3}$, 0.28% by weight (based on the total weight the mixture, excluding water) of a mixture of sodium silicate grade C100 and anhydrous sodium carbonate at a ratio of 3:1 being added as a deflocculant.

This slip was heated to 40° C. and pressure cast at 20 bar. The material produces a cast thickness of 9 millimetres in under four minutes pressing time. The cast body is then processed as in previously known methods to give a vitreous china body.

EXAMPLE 2(a)

A quantity of shredded ball clay having the composition given in Example 1(a) is rotary calciner fired to a temperature of 800° C. for 2 hours giving a product bulk density 1.85 g/cc.

This material is wet ball milled for 2 hours to give a suspension of 50% solids. The product has a particle size distribution of:

| size: | 20μ | 10μ | 5μ | 2μ | 1μ |
|---|---|---|---|---|---|
| % less than: | 97 | 84 | 62 | 45 | 36 |
| (as determined using a Micromeritics Sedigraph). | | | | | |

EXAMPLE 2(b)

The product of Example 2(a) is included as a component in a method for manufacturing a sanitary ware body, in which method
- 13.2% by weight ground treated ball clay product prepared as described in Example 2(a) above;
- 10.8% by weight raw ball clay;
- 26% by weight china clay;
- 30% by weight quartz; and
- 20% by weight nepheline syenite are mixed with water to a slip fluid density of 1.825 gcm$^{-3}$, 0.28% by weight (based on the total weight of the mixture excluding water) of a mixture of sodium silicate grade C100 and anhydrous sodium carbonate at a ratio of 3:1 being added as a deflocculant.

This slip was heated to 40° C. and pressure cast at 20 bar. The material produces a cast thickness of 9 millimetres in under four minutes pressing time. The cast body is then processed as in previously known methods to give a vitreous china body.

What is claimed is:

1. A casting composition for use in the manufacture of china articles, the composition comprising:
   - about 10 to 20 parts by weight of a treated clay product which has been prepared by heating clay, the heating conditions being such that kaolinite in the clay is converted to metakaolin, while substantially avoiding the formation of mullite;
   - about 5 to 20 parts by weight of raw ball clay;
   - about 10 to 35 parts by weight of raw china clay;
   - water;
   - a suitable flux; and
   - a suitable filler the total combined weight of the flux and filler being not less than the combined weight of the treated clay product, the raw ball clay and the raw china clay.

2. A casting composition as claimed in claim 1, wherein the treated clay product has been prepared by heating ball clay.

3. A casting composition as claimed in claim 1, wherein the treated clay product has been prepared by heating china clay.

4. A method of manufacturing a china article, comprising placing in a mould an aqueous slurry including water and about 10 to 20 parts by weight of a treated clay product which has been prepared by heating clay, the heating conditions being such that kaolinite in the clay is converted to metakaolin, substantially avoiding the formation of mullite, the slurry further comprising about 5 to 20 parts by weight raw ball clay and about 10 to 35 parts by weight raw china clay, removing at least some water from the slurry to yield a cast article, draining from the mould any remaining slurry, removing the cast article from the mould, drying and firing the cast article to yield a china article.

5. A method as claimed in claim 4, wherein the aqueous slurry further comprises a flux and a filler.

6. A method as claimed in claim 4, wherein the treated clay product has been prepared by heating ball clay.

7. A method as claimed in claim 6, wherein the aqueous slurry comprises from 10 to 20 parts by weight of treated ball clay product, form 5 to 20 parts by weight of raw ball clay and from 10 to 35 parts by weight of china clay, the slurry further comprising a suitable flux and a suitable filler, the combined weight of the flux and filler being not less than the combined weight of the treated ball clay product, the ball clay and the china clay.

8. A method as claimed in claim 4, wherein the treated clay product has been prepared by heating china clay.

9. A method as claimed in claim 4, wherein a pressure of not less than 40 in$^{-2}$ ($2.7 \times 10^5$Nm$^{-2}$) is maintained in the mould.

10. A method of manufacturing a china article, comprising placing in a mould an aqueous slurry including water and about 10 to 20 parts by weight of a treated clay product which has been prepared by heating clay, the heating conditions being such that kaolinite in the clay is converted to metakaolin, substantially avoiding the formation of mullite, the slurry further comprising, about 10 to 35 parts by weight raw china clay, removing at least some water from the slurry to yield a cast article, draining from the mould any remaining slurry, removing the cast article from the mould, drying and firing the cast article to yield a china article.

11. A method of manufacturing a china article, comprising placing in a mould an aqueous slurry including water and about 10 to 20 parts by weight a treated clay product which has been prepared by heating clay, the heating conditions being such that kaolinite in the clay is converted to metakaolin, substantially avoiding the formation of mullite, the slurry further comprising about 5 to 20 parts by weight raw ball clay, removing at least some water from the slurry to yield a cast article, draining from the mould any remaining slurry, removing the cast article from the mould, drying and firing the cast article to yield a china article.

* * * * *

UNITED STATES PATENT AND TRADEMARK OFFICE
CERTIFICATE OF CORRECTION

PATENT NO. : 5,143,871

DATED : September 1, 1992

INVENTOR(S) : Samuel M. Leese et al.

It is certified that error appears in the above-identified patent and that said Letters Patent is hereby corrected as shown below:

Title page, item [57]
In the Abstract, line 3, "kalinite" should read --kaolinite--.

Title page, item [57]
In the Abstract, line 5, "may" should read --is--.

In the Abstract, line 7, insert --contain 10-20 parts by weight of the above treated clay, 5-20 parts by weight of raw ball clay and/or 10-35 parts by weight of raw china clay, and optionally a flux and filler, and-- after the word "compositions".

In column 1, line 31, insert --lb-- after "300".

In column 4, line 51, "NM" should read --Nm--.

In column 4, line 53, "de-water" should read --de-watering--.

In column 8, line 2, "40 in" should read --40lb in--.

Signed and Sealed this

Ninth Day of November, 1993

Attest:

*Attesting Officer*

BRUCE LEHMAN

*Commissioner of Patents and Trademarks*